Aug. 13, 1946.   F. L. MELVILL   2,405,594
CONTACTING APPARATUS
Filed April 3, 1944   2 Sheets-Sheet 1
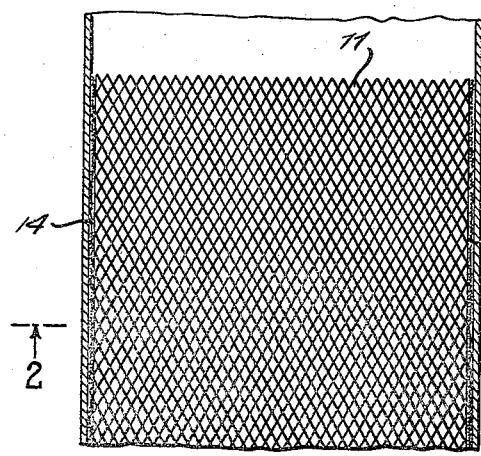
Fig. 1.
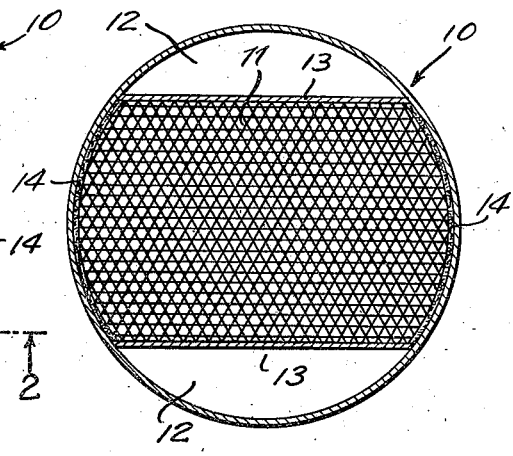
Fig. 2.
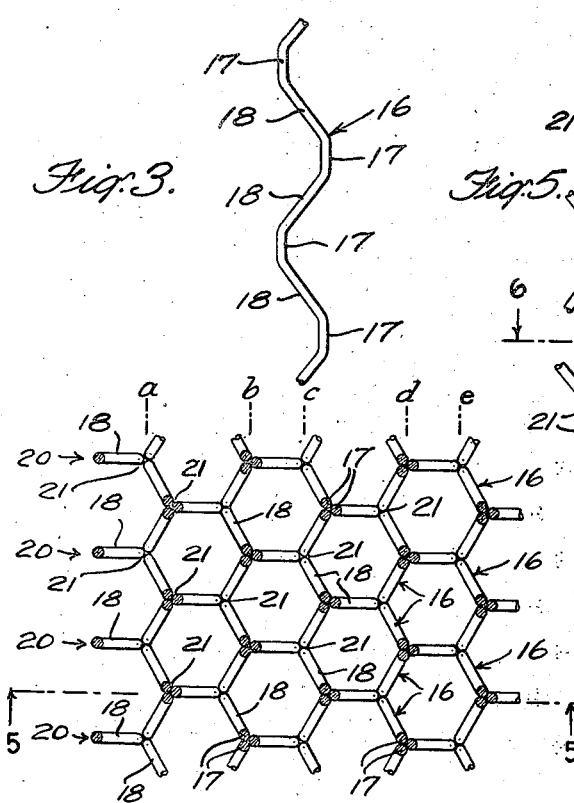
Fig. 3.
Fig. 6.
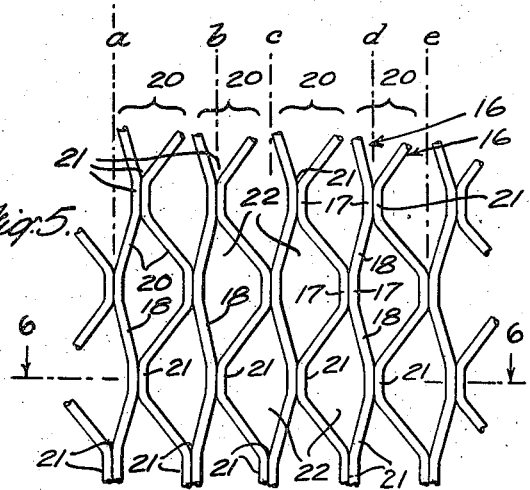
Fig. 5.
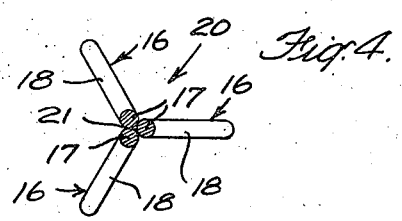
Fig. 4.
INVENTOR
FRANCIS L. MELVILL
BY
ATTORNEY Aug. 13, 1946.    F. L. MELVILL    2,405,594
CONTACTING APPARATUS
Filed April 3, 1944    2 Sheets-Sheet 2
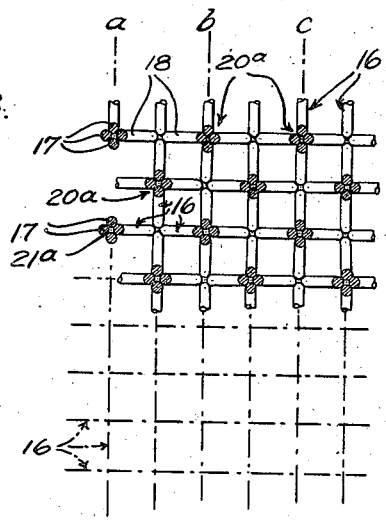
Fig. 8.
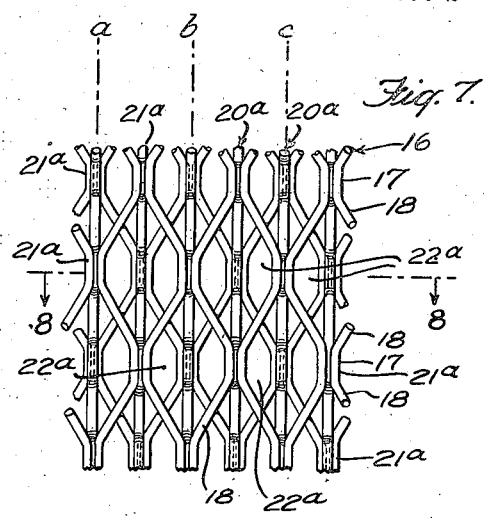
Fig. 7.
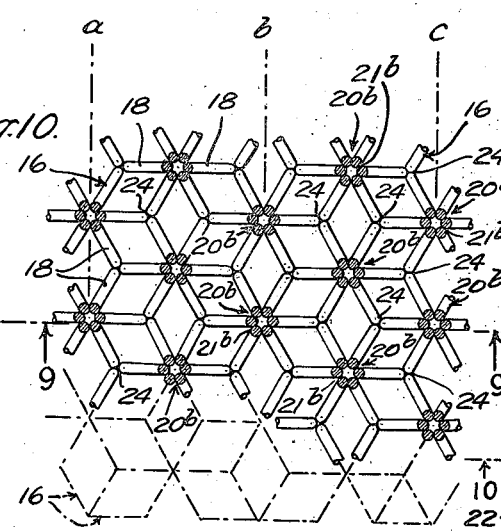
Fig. 10.
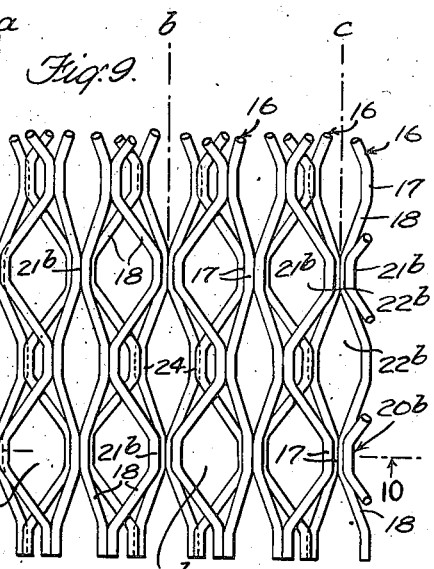
Fig. 9.
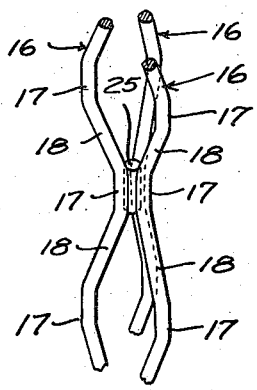
Fig. 11.
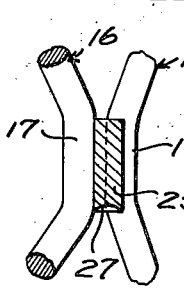
Fig. 12.
Fig. 13.
INVENTOR
FRANCIS L. MELVILL
BY
ATTORNEY Patented Aug. 13, 1946

2,405,594

UNITED STATES PATENT OFFICE 2,405,594

CONTACTING APPARATUS

Francis L. Melvill, New York, N. Y.

Application April 3, 1944, Serial No. 529,246

12 Claims. (Cl. 261—95)

This invention relates to apparatus for the contacting of gases or vapors and liquids. Although the invention has a wide range of utility, it is particularly useful in connection with contacting apparatus such as is employed for the absorption, cooling, drying, cleansing or humidifying of gases, for the evaporation, cooling or heating of liquids, or for reaction purposes. Such apparatus may, for example, take the form of fractionating towers, scrubbers, cooling towers and the like. In such apparatus, a packing is usually employed for effecting intimate contact between the descending liquid and the ascending gas or vapor. As used herein and in the claims, the term "gas" includes vapor within its scope.

The invention provides a new and improved countercurrent gas and liquid contact apparatus in which the flow of liquid downwardly through a treating chamber is effected in regular predetermined symmetrical manner to assure uniform distribution of the liquid throughout the liquid flow area of the chamber.

The invention provides a novel packing for gas and liquid contacting apparatus which avoids the presence of unequal gas or liquid passages and prevents channeling or segregation of the flowing gas in open spaces and of the liquid along surface areas, with the result that at any cross-section of the packing at right angles to the general direction of countercurrent flow of the liquid and gas, the composition of the liquid and gas is substantially uniform.

The invention also provides a new and improved packing of the general character described, which feeds and spreads out the liquid evenly in a thin film and in a regular predetermined symmetrical manner as it descends in a treating chamber, so that even distribution of the liquid throughout the flow area of the chamber is afforded, which provides the maximum of effective (i. e., wetted) surface area per unit of packing space, offers a minimum of resistance to the passage of the ascending gas, and affords a maximum of intimacy of contact and interaction between liquid and gas, so that equilibrium between the fluid in either phase immediately adjacent to the inter-face and the main bulk of the fluid comprising the phase is rapidly attained.

The invention further provides a packing of the general character described, which comprises a series of simple, comparatively inexpensive elements requiring little or no shaping, and which can be easily and expeditiously assembled.

In operation of the apparatus of the invention, liquid is subdivided into a predetermined number of thin exposed streams which are directed downwardly along substantially uniform zig-zag courses deviating between different vertical planes. These zig-zag stream courses are relatively disposed to merge with the apices of adjoining stream courses at regularly disposed, equally spaced zones, whereby predetermined groups of adjoining streams merge and are intermixed at these zones, and are then subdivided into a corresponding number of thin streams for subsequent merger with other streams. Due to the deviating course of the streams between different vertical planes, the liquid is uniformly distributed throughout the flow area of the packing.

Packing embodying the invention, comprises slender packing elements in the form of rods, wires, tubes, flat strips or the like, which are uniformly zig-zagged and made to extend generally vertically in the contacting zone. These elements are arranged in groups in accordance with a predetermined pattern, the elements of each group being disposed in different vertical planes and converging downwardly at equal inclinations towards junctures to form a liquid mixing zone, and diverging downwardly from these points of juncture at equal inclinations to subdivide and redistribute the mixed liquid from said zone. This operation of mixing, subdividing and redistributing the liquid streams is repeated regularly in accordance with a predetermined pattern to assure uniformity in the composition of the liquid and gas throughout the flow area of the packing at any horizontal section thereof.

The invention will be understood from the following description when considered in connection with the accompanying drawings, forming a part thereof, and in which:

Fig. 1 is a fragmentary axial vertical section, somewhat diagrammatic, of a gas and liquid contacting device containing a packing embodying the present invention;

Fig. 2 is transverse section, somewhat diagrammatic, of the contacting device taken on the line 2—2 of Fig. 1;

Fig. 3 is a side elevation of a packing element which is employed to form a packing constituting one embodiment of the invention;

Fig. 4 is a horizontal sectional view on an enlarged scale, of a triad of packing elements forming one of the constituent groups of a packing of the invention, and shown interconnected in direct contact in accordance with one embodiment of the invention;

Fig. 5 is a fragmentary front elevation of a packing which comprises a series of triads of the type shown in Fig. 4; and which constitutes one embodiment of the invention, the different vertical planes, a, b, c, d and e indicated thereon positionally corresponding to the planes a, b, c, d and e in the horizontal sectional view of Fig. 6;

Fig. 6 is a horizontal section taken on line 6—6 of Fig. 5, the vertical planes a, b, c, d and e indicated thereon positionally corresponding to the planes a, b, c, d and e in Fig. 5;

Fig. 7 is a fragmentary front elevation of another form of packing embodying the invention, the elements being arranged in groups of four, the different vertical planes, a, b and c indicated thereon positionally corresponding to the planes a, b and c in the horizontal section of Fig. 8;

Fig. 8 is a horizontal section taken on line 8—8 of Fig. 7, the vertical planes, a, b and c indicated thereon positionally corresponding to the planes a, b and c in Fig. 7;

Fig. 9 is a fragmentary front elevation of a further form of packing embodying the invention, the elements being arranged in groups of six and three, the vertical planes, a, b and c indicated thereon positionally corresponding to the planes a, b and c in the horizontal section of Fig. 10;

Fig. 10 is a vertical section taken on line 10—10 of Fig. 9, the vertical planes a, b and c indicated thereon positionally corresponding to the planes a, b and c in Fig. 9;

Fig. 11 is a fragmentary perspective showing a group of zig-zag packing elements interconnected at their apices through a core piece in accordance with another embodiment of the invention;

Fig. 12 is a fragmentary vertical section, on a larger scale, of the construction of Fig. 11, and Fig. 13 is a vertical section similar to that of Fig. 12, but showing another form of core piece for interconnecting the group elements together at their apices.

Like characters of reference refer to the same or to similar parts throughout the several views.

Referring to Figs. 1 and 2 of the drawings, the gas and liquid contacting device shown, comprises a vertical cylindrical column or tower 10 containing the packing 11 of the invention. The gas to be contacted is delivered to the lower portion of the tower 10 below the packing 11, and flows upwardly through the packing, while the liquid is fed to the upper portion of the tower above the packing, and flows downwardly through the packing and in intimate contact with the ascending gas in the manner to be described. The liquid preferably is delivered to the upper portion of the tower 10 and over the packing 11 in such scattered form as to be spread evenly over or substantially evenly over the top of the packing 11, so that the liquid is distributed substantially uniformly throughout the packing at its upper end. For that purpose, the liquid may be delivered over the packing 11 in spray form, or it may be delivered by a liquid feed device similar to that shown and described in my copending application Serial No. 536,306, filed May 19, 1944, to feed the liquid in predetermined equally spaced fine or thin streams over the packing.

The packing 11 is shown occupying the central portion of the tower 10, while the diametrically opposite side chordal sections 12 of the tower are left vacant or unpacked. A pair of partition plates 13 on the chordal sides respectively of the packing 11 prevent flow into or out of the packing through these sides. The unpacked spaces 12 of the tower 10 may be sealed either at the bottom or at the top in any manner well-known in the art to prevent by-pass flow through these spaces. The clearance between the circular peripheral portions of the packing 11 and the corresponding wall of the tower 10 may be sealed by any suitable means, as for example by means of layers 14 of glass wool.

The packing 11 comprises a series of slender elements 16 (Fig. 3) which may be in the form of wires, tubes, flat strips or the like, and which are shown specifically as solid cylindrical rods. These packing elements 16 are identical in cross-sectional size, shape and finish, and their surfaces are of such material and finish as to be substantially wetted by the liquid under normal operating conditions. For that purpose, the packing elements 16 are desirably of a material, such as metal, plastic or the like, having the necessary finish to afford the required wetting properties.

Although the packing elements 16 are shown of cylindrical stock, as far as certain aspects of the invention are concerned, they may be of any suitable symmetrical cross-sectional shape. For example, the surface of the elements may be grooved, fluted or otherwise treated to form a regular pattern thereon. These surface grooves may extend parallel to the longitudinal axes of the elements 16, or may extend helically about the circumferences of the elements. Such surface grooving of the elements 16 ordinarily will increase the liquid carrying capacity of the elements. Also, instead of using single rods, wires or the like, as far as certain aspects of the invention are concerned, each of the packing elements 16 may consist of multiple wires, braided or helically twisted together, or laid side by side.

Each of the packing elements 16 is regularly zig-zagged to form a plurality of alternately arranged apical turn sections 17 interconnected by oblique sections 18. The turn sections 17 preferably are straight to permit their effective interconnection into fork groups as will be described, and are of equal length in order to attain symmetry and regularity in the packing arrangement. The intermediate oblique sections 18 are also straight and of equal length, and are equiangular with respect to the turn sections 17. The elements 16 are respectively uniplanar, and extend generally vertically with alternate turn sections 17 in vertical alignment. These packing elements 16 are arranged in groups with the turn sections 17 of the elements in each group brought together to form a liquid mixing zone at the juncture. Each group comprises at least three elements 16 which extend in different vertical intersecting planes, and the vertical planes of all the elements of the group are equiangularly spaced.

In the form of the invention shown in Figs. 3, 4, 5 and 6, each group consists of three elements 16 joined together at alternate apical turn sections 17 to form liquid mixing zones 21 at their juncture, and extending in vertical planes 120° apart. The triads 20 so formed are interconnected at their intervening apical turn sections 17, so that each element forms part of, or is common to, two adjoining triads, and the junctures where the adjoining triads are interconnected form liquid mixing zones 21. As a result of this arrangement, each triad 20 defines a row of open cells 22, which are approximately in the form of right trigonal bipyramids, and which have their vertices or mixing zones 21 in vertical alignment. The adjoining vertical rows of open cells 22 are medially staggered to form a regular predetermined honeycomb pattern, as shown.

The elements 16 are interconnected together at their junctures 21 with their straight turn sections 17 parallel, and with each section 17 at one juncture in longitudinal contact with the two turn sections 17 on either side thereof at the juncture. The area of contact between the apical turn section of any element and the corresponding apical turn section of its immediate neighbor is substantially the same as the area of contact between the turn section of any other element 16 and its immediate neighbor. The straight turn sections 17 are secured together at a juncture 21, as for example, by welding, and are longitudinally arranged in horizontal registry, so that all the oblique sections 18 of each group 20 begin to diverge from each other in the same horizontal planes above and below their corresponding junctures 21. The weld or weld metal should be located as high as possible above the plane at which the oblique sections 18 diverge, and in any event should not extend below the lowermost points of contact of the elements of the junctures, to prevent irregularities at the bottom of the junctures which might cause liquid to flow therefrom in the form of droplets or to be distributed unequally. These oblique sections 18 form equal angles with the vertical line about which they are symmetrically grouped.

The openings defined by the cells 22 and through which the ascending gas passes, are large enough to prevent capillary filming of the downwardly flowing liquid across the openings, but are as small as possible having regard for the gas and liquid load. The diameter of the elements and the extent of zig-zag offset will depend upon the character of the liquid being treated and the ratio of liquid to gas volumes. In a specific application, the elements 16 may be about one-tenth of an inch in diameter, and may be offset by the zig-zags to an extent equal to about twice their diameter. The drawings show a zig-zag offset greater than twice the diameter of the elements 16 in order to more clearly represent the shape of the open cells 22, but it will be understood that the drawings do not necessarily represent the actual proportions of the elements, and that in practice, the proportions of the elements will vary according to the conditions encountered.

The elements 16 may be made as long as desired. For example, they may be long enough to extend the full height of the packing, or may be of shorter length and vertically aligned in end to end abutment. If the elements 16 are of the shorter length mentioned, they may be arranged so that the joints between vertically aligned elements in one vertical row are staggered in different planes with respect to the joints between the vertically aligned elements in the other rows, thereby forming a packing unit of substantial rigidity with constituent elements 16 inseparably united.

Instead of making the packing into one single indivisible unit, the packing may be made in the form of horizontal layers, each constructed as described, except for the use of shorter elements 16. For example, the elements 16 may be all of equal length, and long enough to include two alternate turn sections 17 and one intermediate turn section. A packing layer constructed with elements 16 of such length, will include at least one horizontal row of open adjoining bipyramidal cells 22. In forming the composite packing, these individual layers would be stacked with the elements of superposed layers in end to end registering abutment, so as not to interrupt the continuity and regularity of flow between successive layers.

In the use of the packing of Figs. 1 to 6, the liquid with which it is desired to contact the ascending gases, is delivered to the top section of the packing as previously described, and is divided into a number of predetermined exposed film-like streams which flow obliquely downwardly along the elements 16 on regular zig-zag courses in directions generally counter to the direction of flow of the gas. The maximum of liquid surface is thereby exposed to the action of the ascending gases. The liquid stream flowing down a single oblique section 18 of an element 16 in one group 20, merges at a liquid mixing junction zone 21 with the liquid stream flowing down the other two adjoining oblique sections of the group. Since the three oblique element sections 18 of a group 20 are of equal shape, diameter and surface finish, and converge downwardly with equal inclinations towards their juncture 21, the liquid streams flowing along these element sections will have similar dimensional and motional characteristics. At the junction 21, the three liquid streams are thoroughly intermixed, and the resulting mixture is then subdivided and redistributed equally between the three lower oblique sections 18 of the group diverging downwardly with equal inclinations from the junction zone. Each of these lower downwardly diverging oblique sections 18 of a group 20, forms part of another group 20, and converges downwardly towards the two corresponding downwardly converging oblique sections 18 of the latter group and towards juncture with the last-mentioned oblique sections 18. The stream along one element 16 of a group 20 therefore becomes intermixed not only with the other streams of the group, but with all the streams of all the other groups. This zig-zag flow, joinder, subdivision and redistribution of the liquid streams, and their deviation to different vertical planes is regularly repeated, so that the descending liquid is uniformly mixed and distributed throughout the entire flow area of the packing.

If the flow along the different oblique element sections 18 is not equal, the degree of irregularity will tend to become progressively reduced, due to the fact that each section will divide the whole of the liquid reaching a mixing zone 21 equally with its element partner in that zone. This is particularly important in the upper section of the packing where the liquid feed may not be deposited uniformly over the top of the packing. By the equalizing process described, the distribution of the liquid under these conditions will become uniform in the upper section of the packing. Uniform distribution of the liquid when once attained near the top of the packing, will persist to the bottom of said packing. The gas passing upwardly generally countercurrent to the liquid, is subjected to sufficient turbulence to cause thorough mixing, thus avoiding the loss of efficiency which results when the gas at the liquid-gas interface is not mixed as rapidly as possible with the main bulk of the gas, and when other purely local conditions within the packing tend to vary the composition of the gas across any section of the tower.

As a result of the packing construction of the invention, the upward velocity of the gas will be substantially the same at any point in any plane at right angles to the general direction of flow. Maximum intimacy of contact and maximum interaction between liquid and gas is obtained, and equilibrium is rapidly established between the material in either liquid or vapor phase immediately adjacent to the interface and the main bulk of the material comprising the phase. On any cross-section of the packing at right angles to the general direction of flow of the liquid and the gas, the composition of the gas is substantially the same, and the composition of the liquid in its constituent streams is substantially the same. A comparatively long path of travel of the liquid passing through the packing is provided, so that retention of the liquid for a period long enough to assure the necessary saturation or interaction with the gas is assured.

In Figs. 7 and 8 is shown another form of packing embodying the invention. In this form, the individual elements 16 are constructed as indicated in connection with Figs. 3 to 6. These elements 16, however, instead of being connected in groups of three, are connected in groups of four, with the elements of each group extending respectively in vertical planes approximately 90° apart, and joined together at alternate apical turn sections 17 to form liquid mixing zones 21a at their junctures. The tetrads 20a so formed are interconnected at their intervening apical turn sections 17, so that each element 16 forms part of two adjoining tetrads, and the junctures where the adjoining tetrads are interconnected form liquid mixing zones 21a. As a result of this arrangement, each tetrad 20a defines a row of open cells 22a, which are approximately in the form of right tetragonal bipyramids, and which have their vertices 21a in vertical alignment. Adjoining vertical rows of open cells 22a are medially staggered to form a regular predetermined honeycomb pattern, as shown.

The elements 16 are interconnected at their junctures 21a with their straight turn sections 17 parallel, and with each turn section 17 at one juncture in longitudinal contact with two turn sections 17 on either side thereof at the juncture. The area of contact between the apical turn sections 17 of any element 16 and the corresponding apical turn section 17 of its immediate neighbor is substantially the same as the area of contact between a turn section 17 of any other element 16 and that of its immediate neighbor.

The straight turn sections 17 are secured together at a juncture 21a, for example by welding, and are longitudinally arranged in registry as in the construction of Figs. 3 to 6, whereby the oblique sections 18 of each group begin to diverge from each other in the same horizontal planes above and below their corresponding juncture, and form equal angles with the vertical line about which they are symmetrically grouped. The welds should be located as high as possible above the plane at which the oblique sections 18 diverge, and should not extend below the lowermost points of contact of the elements at the junctures, for the reasons previously mentioned.

The operation of the packing of Figs. 7 and 8 is similar to that described in connection with the constructions of Figs. 3 to 6.

In Figs. 9 and 10 is shown another form of packing embodying the invention. In this form of the invention, the individual elements 16 are constructed as shown in Figs. 3, 4, 5 and 6. However, each group consists of six elements 16 joined together by welding or the like as previously described, at alternate apical turn sections 17, to form liquid mixing zones 21b at their junctures, and extending in respective vertical planes approximately 60° apart. The hexads 20b so formed, are interconnected at their intervening apical turn sections 17, by welding or the like as previously described, so that two elements 16 of one hexad are joined at two intervening apical turn sections 17 with two corresponding elements of an adjoining hexad, and each element of a hexad 20b is joined at these intervening apical turn sections 17 with two elements of two respective adjoining hexads 20b. The junctures where the adjoining hexads 20b are interconnected, form liquid mixing zones 24, each having three turn sections 17 of three respective elements 16 symmetrically grouped in contact around a vertical axis, the three adjacent oblique sections 18 of these three elements respectively forking upwardly and downwardly at equal inclinations from said zones, and from the same starting planes. As a result of the arrangement described, each hexad 20b defines a row of open cells 22b which are approximately in the form of right hexagonal bipyramids, and which have their vertices 21b in vertical alignment. Adjoining vertical rows of open cells 22b are medially staggered to form a regular predetermined honeycomb pattern, as shown.

The liquid streams in each hexad group 20b are merged, thoroughly intermixed and subdivided for redistribution at the mixing zones 21b, and are intermixed with the streams of adjoining groups 20b at the mixing zones 24 for uniform distribution to the elements 16 of these adjoining groups.

In the different forms of the invention so far described, the elements 16 of each group are interconnected at their apical turn sections 17 by direct contact of these sections, to form liquid mixing zones at their junctures. In the form of the invention shown in Figs. 11 and 12, the elements of each group are gathered symmetrically around, and in direct contact with, a core piece 25, and are welded, or otherwise rigidly connected to, the core piece to form a liquid mixing zone therewith. As previously mentioned, the welds should be located as high as possible above the plane at which the oblique sections 18 diverge, and in any event should not extend below the lowermost portion of contact of the elements with the core piece. This core piece 25 is regular in horizontal cross-section, and must be of such shape that the elements 16 can be attached to it and can be symmetrically disposed about the vertical axis thereof. For that purpose, the core piece 25 may be cylindrical in shape or may be a fluted cylinder with a number of flutes equal to, or a multiple of, the number of elements attached to it. The surface material and finish of each core piece 25 are desirably such that the surface of the core piece is substantially wetted by the liquid under operating conditions, and preferably are the same as that of the elements 16.

The core pieces 25 are so arranged with respect to the elements 16 at a juncture, that the liquid passing over the core pieces tends to drain to the elements in preference to forming liquid droplets. To reduce the tendency toward dripping, the bottom of the core piece 25 should not extend below the bottom of the meniscus formed by the liquid between the surface of the core piece and the surface of any of the elements 16 adjacent thereto. For that purpose, the elements 16 of a group, in the construction of Figs. 11 and 12, begin to diverge from the corresponding core piece 25 as near to its lower edge as possible.

In this form, the core piece 25 is substantially of the same length as the straight turn sections 17 of the elements 16 grouped around it, and is disposed in horizontal registry with the turn sections, so that the ends of the core piece are substantially coextensive with the ends of the turn sections. To further assure against dripping of the liquid from the core pieces 25, the bottom thereof is made concave by a depression 27.

In the form of the invention shown in Fig. 13, the straight turn sections 17a of the elements 16a are made substantially longer than the core pieces 25a, and the bottom of each core piece is made to extend a substantial distance above the horizontal plane where the encompassing elements 16a begin to diverge downwardly away from juncture. In this manner, the tendency toward dripping of the liquid from the bottom of the core piece is reduced. The bottom of the core piece 25a may be flat as shown, or it may be concave as in the construction of Fig. 12.

In the forms of the invention shown in Figs. 11, 12 and 13, since the elements 16 or 16a are identical in size, shape, material and finish, and are located symmetrically about the core pieces 25 or 25a, the area of contact between any element and a core piece at a liquid mixing zone is substantially the same as the area of contact between any other element and the core piece at said zone, and the area of contact between the elements in one group and their corresponding core pieces is the same as the area of contact between the elements of any other group and their corresponding core pieces. The elements 16 or 16a of each group all begin to diverge from the same horizontal planes above and below their mixing zones, and make equal angles with a vertical axis constituting the center of the zone and of the group. By means of this symmetrical arrangement, a uniform mixing and distribution of the liquid throughout the flow area of the packing is obtained, as described in connection with the constructions of Figs. 1 to 10. Although in the forms shown in Figs. 11 to 13 the elements 16 or 16a are indicated as being arranged in groups of three, any number of these elements may be provided in each group symmetrically arranged, as already described.

The packing herein described is applicable to gas and liquid contacting devices, such as bubble towers, scrubbers, cooling towers, fractionating towers and the like, but it is not intended that the packing should be limited to equipment of this type. It is also contemplated that the packing itself may be used as a catalyst. Under these conditions, the packing itself may, for example, be made of nickel, copper or any of the solid materials having the required catalytic properites. For that purpose, the catalytic packing may serve to increase the rate of reaction by contact with a gas, or by contact with a liquid.

As another example of the use of the packing of the invention, it may serve as a catalyst carrier, the catalyst, for example, being formed into beads which are threaded on the elements defining the packing. Also, if desired, the surface of the packing elements may be subjected to special treatment to form a layer of catalytic material thereon. As a further example of the use to which the packing may be put, it may serve as a carrier of a catalyst which takes the form of a liquid, and particularly a high viscous liquid such as phosphoric acid.

Inasmuch as each element has portions which extend in a downwardly inclined direction from the inner wall of the tower 10, liquid which reaches the wall by way of some of the elements will flow away from the wall by other elements and thus will tend to retain the liquid in the packing and prevent short circuiting flow down the wall of the tower.

The velocity of the vapor flowing upwardly through the packing will cause or tend to cause the liquid on the vertically inclined portions of the elements to assume a streamlined or tear drop shape such as would present the minimum resistance to the flow of vapors and this, together with the surface effects which become pronounced with thin films of liquid, will have the effect of distributing the liquid over the surfaces of the elements with a tendency for a major part of the liquid to flow down the upper parts of the elements, the amount of liquid so flowing increasing with increased vapor velocity. The effect of this is to insure the maximum exposure of the liquid to the vapor and to facilitate the mixing of the streams of liquid at the juncture points.

As many changes can be made in the apparatus herein disclosed, and many apparently widely different embodiments of the invention can be made without departing from the principles of the invention, it is intended that all matter contained in this description or shown in the accompanying drawings shall be interpreted as illustrative and not in a limiting sense.

What is claimed is:

1. A tower packing comprising a series of similar zig-zag slender elements extending generally vertically and regularly arranged in accordance with a predetermined repeat pattern, and a series of core pieces, said elements being joined at their turns in regular groups around said core pieces to form liquid mixing zones at their junctures, element sections diverging generally upwardly and downwardly in opposite directions from each juncture.

2. A tower packing comprising a series of similar zig-zag slender elements of cylindrical stock, extending generally vertically and regularly arranged in accordance with a predetermined repeat pattern, and a series of cylindrical core pieces, said elements being joined at their turns in regular groups of at least three around said core pieces to form liquid mixing zones at their junctures, element sections diverging generally upwardly and downwardly in different respective planes and in opposite directions from each juncture.

3. A tower packing comprising a series of similar slender elements extending generally vertically and regularly arranged in accordance with a predetermined repeat pattern, each of said elements being zig-zagged, and having a series of alternate substantially straight turn sections interconnected by oblique sections, said elements being joined together in groups of at least three at their turn sections to form liquid mixing zones at their junctures, the turn sections of each group of elements extending substantially parallel at their corresponding juncture, the oblique section of each group diverging generally upwardly and downwardly in opposite directions from each juncture.

4. A tower packing comprising a series of similar slender elements extending generally vertically and regularly arranged in accordance with a predetermined repeat pattern, each of said elements being zig-zagged, and having a series of alternate substantially straight turn sections interconnected by oblique sections, and a series of straight core pieces, said elements being joined together in groups at their turn sections around said core pieces to form liquid mixing zones at their junctures, the turn sections of each group extending substantially parallel around a core piece at their corresponding juncture, sections of said elements diverging generally upwardly and downwardly in opposite directions from each juncture, the lower end of each core piece in a group extending a substantial distance above the horizontal plane where the element sections in said latter group begin to diverge downwardly at a juncture.

5. A tower packing comprising a series of similar slender elements extending generally vertically and regularly arranged in accordance with a predetermined repeat pattern, each of said elements being zig-zagged, and having a series of alternate substantially straight turn sections interconnected by oblique sections, and a series of straight core pieces, said elements being joined together in groups of at least three at their turn sections around said core pieces to form liquid mixing zones at their junctures, the turn sections of each group extending substantially parallel around a core piece at their corresponding juncture, the oblique sections in each group diverging generally upwardly and downwardly in opposite directions from each juncture, the lower end of each core piece in a group being concave to minimize dripping of the liquid from said latter core piece.

6. Vapor and liquid contacting apparatus packing comprising a network of slender, generally vertically extending elements arranged in groups of at least three in accordance with a predetermined pattern, the elements of each group being disposed in different vertical planes, each of said elements being of zig-zag shape and having alternately arranged apical turn sections interconnected by oblique sections, the elements of each group being joined together at their turn sections to form liquid mixing zones at their junctures.

7. Vapor and liquid contacting apparatus packing comprising a network of slender, generally vertically extending elements arranged in groups of at least three in accordance with a predetermined pattern, the elements of each group being disposed in different vertical planes, each of said elements being of zig-zag shape and having alternately arranged straight apical turn sections of equal length interconnected by oblique sections, the elements of each group being joined together at their turn sections to form liquid mixing zones at their junctures.

8. Vapor and liquid contacting apparatus packing comprising a network of slender, generally vertically extending elements arranged in groups of at least three in accordance with a predetermined pattern, the elements of each group being disposed in different vertical planes, each of said elements being of zig-zag shape and having alternately arranged straight apical turn sections of equal length interconnected by oblique sections of equal length which oblique sections are equiangular with respect to said turn sections, the elements of each group being joined together at their turn sections to form liquid mixing zones at their junctures.

9. Vapor and liquid contacting apparatus packing comprising a network of slender, generally vertically extending elements arranged in groups of three in accordance with a predetermined pattern, the elements of each group being disposed in different vertical planes approximately 120° apart, each of said elements being of zig-zag shape and having alternately arranged apical turn sections interconnected by oblique sections, the elements of each group being joined together at their turn sections to form liquid mixing zones at their junctures.

10. Vapor and liquid contacting apparatus packing comprising a network of slender, generally vertically extending elements arranged in groups of four in accordance with a predetermined pattern, the elements of each group being disposed in quadrantly related vertical planes, each of said elements being of zig-zag shape and having alternately arranged apical turn sections interconnected by oblique sections, the elements of each group being joined together at their turn sections to form liquid mixing zones at their junctures.

11. Vapor and liquid contacting apparatus packing comprising a network of slender, generally vertically extending elements arranged in groups of six with the elements of each group disposed in respective vertical planes approximately 60° apart, each of said elements being of zig-zag shape and having alternately arranged apical turn sections interconnected by oblique sections, the elements of each group being joined together at their turn sections to form liquid mixing zones at their junctures.

12. Liquid and vapor contacting apparatus comprising a column and a packing therefor, said packing comprising a series of slender, vertically extending elements arranged in groups of at least three and interconnected to form a network of substantially bipyramidal open cells following a predetermined repeat pattern, each of said elements being of zig-zag shape and having alternately arranged apical turn sections interconnected by oblique sections, the elements of each group being joined together at their turn sections to form liquid mixing zones at their junctures.

FRANCIS L. MELVILL.